(12) United States Patent
Iotti

(10) Patent No.: US 11,993,496 B2
(45) Date of Patent: May 28, 2024

(54) ELECTRIC TELEHANDLER

(71) Applicant: MANITOU ITALIA S.R.L., Castelfranco Emilia (IT)

(72) Inventor: Marco Iotti, Reggio Emilia (IT)

(73) Assignee: MANITOU ITALIA S.R.L., Castelfranco Emilia (IT)

( * ) Notice: Subject to any disclaimer, the term of this patent is extended or adjusted under 35 U.S.C. 154(b) by 146 days.

(21) Appl. No.: 17/643,700

(22) Filed: Dec. 10, 2021

(65) Prior Publication Data

US 2022/0204326 A1  Jun. 30, 2022

(30) Foreign Application Priority Data

Dec. 28, 2020  (IT) .......... 102020000032532

(51) Int. Cl.
   *B66F 9/075*   (2006.01)
   *B60L 53/80*   (2019.01)
   *H01M 50/244*  (2021.01)
   *H01M 50/249*  (2021.01)

(52) U.S. Cl.
   CPC ............ *B66F 9/0754* (2013.01); *B60L 53/80* (2019.02); *B66F 9/07536* (2013.01); *H01M 50/244* (2021.01); *H01M 50/249* (2021.01); *H01M 2220/20* (2013.01)

(58) Field of Classification Search
   CPC .... B66F 9/0754; B66F 9/07536; B60L 53/80; H01M 50/249; H01M 50/244; H01M 2220/20
   See application file for complete search history.

(56) References Cited

U.S. PATENT DOCUMENTS

| 10,829,351 | B2  | 11/2020 | Wild et al. |
| 2008/0006459 | A1* | 1/2008 | Niebuhr ............... B66F 9/0754 |
| | | | 180/68.5 |
| 2011/0068309 | A1* | 3/2011 | Haslberger ........... B60L 50/66 |
| | | | 254/2 R |
| 2019/0300348 | A1  | 10/2019 | Wild et al. |
| 2019/0389705 | A1  | 12/2019 | Radtke et al. |
| 2020/0317083 | A1* | 10/2020 | Messina ............... B28C 5/4227 |
| 2022/0098017 | A1* | 3/2022 | Di Florio | |

FOREIGN PATENT DOCUMENTS

| DE | 19956623 | | 6/2001 |
| DE | 102012106215 | | 1/2014 |
| EP | 0569277 | B1 * | 5/1993 |
| EP | 0569277 | | 10/1995 |
| EP | 3546418 | | 10/2019 |
| EP | 3587163 | | 1/2020 |
| FR | 0569277 | B1 * | 10/1995 |

OTHER PUBLICATIONS

English Translation of EP 0569277 B1, Braud (Year: 1993).*

* cited by examiner

*Primary Examiner* — James A Shriver, II
*Assistant Examiner* — Nicholas R. Kandas
(74) *Attorney, Agent, or Firm* — Pearne & Gordon LLP; J. Gregory Chrisman

(57) ABSTRACT

Described is an electrically powered telehandler (1) equipped with an electric motor, a containment compartment (100) for receiving an electric battery (200) for powering the motor. An electric battery (200) which can be inserted in and removed from the compartment (100). The compartment (100) is equipped with an access opening to allow replacement of the battery (200) and guide means (103, 104) for the sliding of the battery (200) during insertion and extraction.

11 Claims, 4 Drawing Sheets

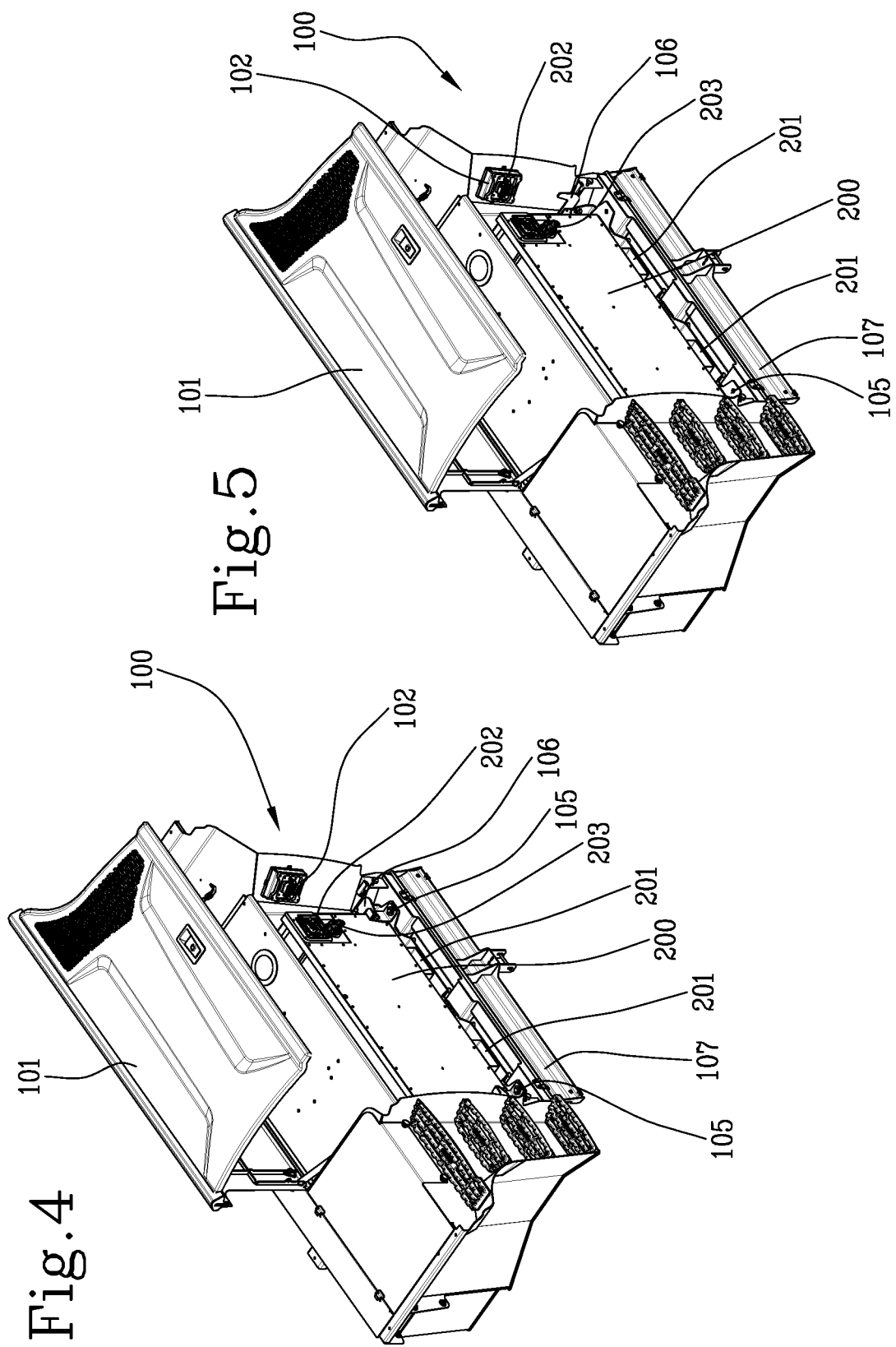

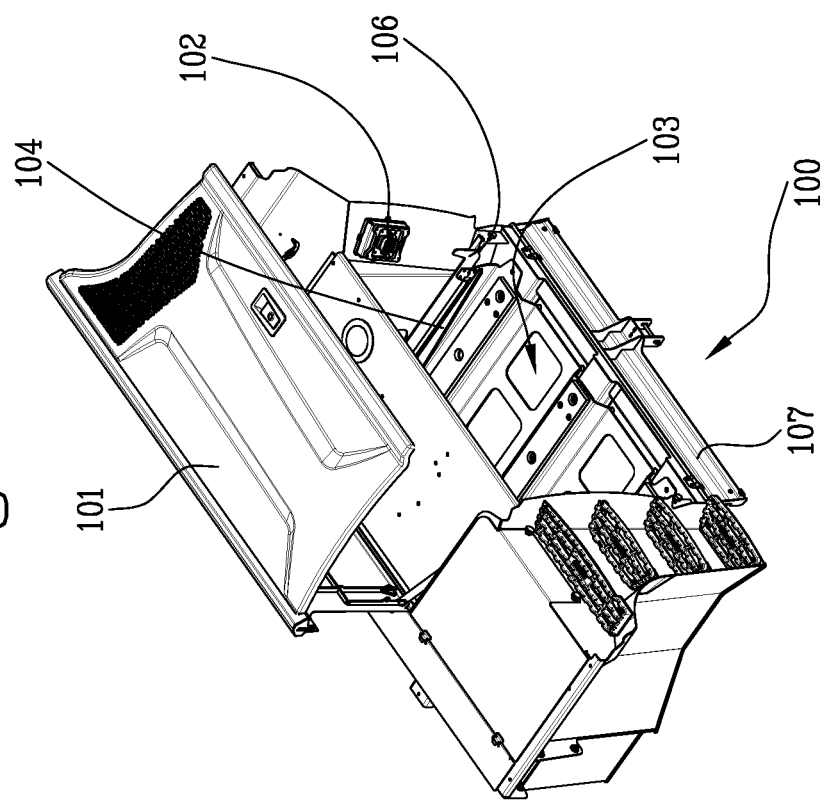
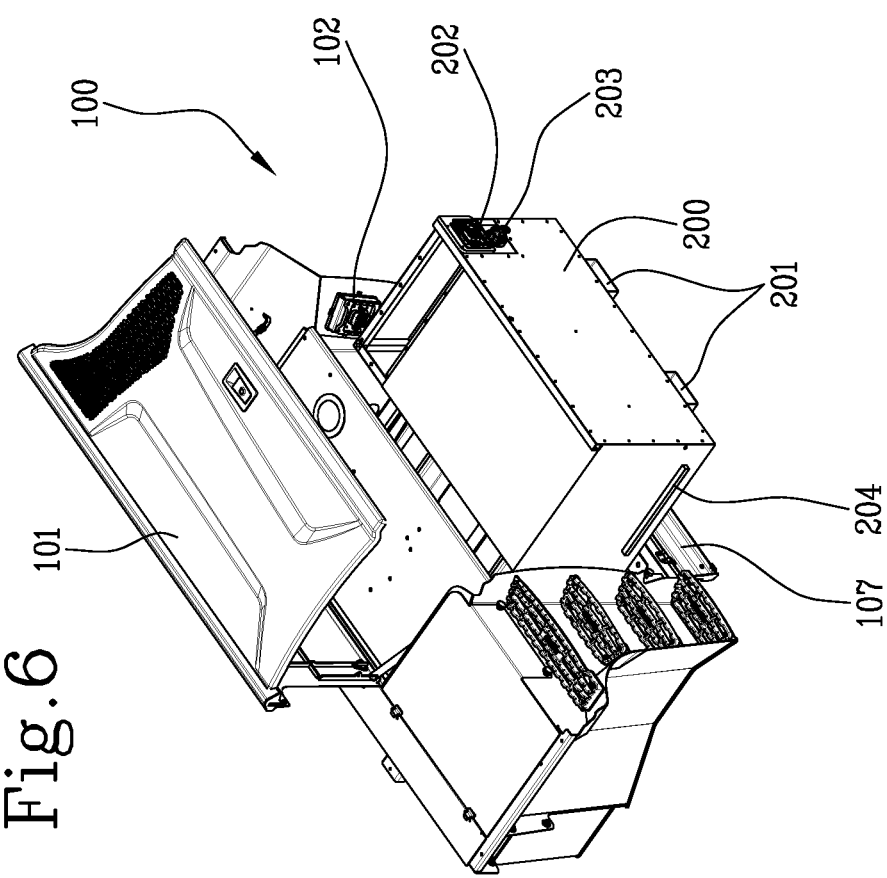

ELECTRIC TELEHANDLER

This invention relates to an electric telehandler.

More in detail, the invention relates to an electric telehandler with batteries which can be replaced.

There are prior art electric telehandlers, equipped with an electric motor, powered by one or more batteries, in place of the traditional internal combustion engine, which have the advantage of not diffusing exhaust gas in the environments in which they work.

The environmental regulations of many countries require that electric telehandlers be used instead of those with a fossil fuel power supply if works are to be performed in closed environments, such as industrial sheds, or in zones of residential centres where restrictions apply to the traffic and to the type of vehicles allowed to circulate, such as town centres.

However, it has been found in practice that, in both the above-mentioned cases, the use of prior art electric telehandlers is subject to practical limitations, which reduce the efficiency.

In effect, on the one hand, the energy supplied by a battery, even completely charged, may not be sufficient to allow the users of an electric telehandler to complete the programmed work and, on the other hand, in the town centres, for example, it may be complicated to find a recharging source to which to connect the battery.

In addition, even if an electricity generator were available, in the case, for example, in which the telehandler is operating inside a shed, the interruption of the operating activities due to the need to recharge the battery significantly affects the time for completion of the programmed activities.

The technical purpose which forms the basis of the invention is to provide an electric telehandler which overcomes the limitations of the prior art.

The technical purpose indicated is achieved by the telehandler made according to the appended claims.

Further characteristics and advantages of the present invention will become more apparent in the non-limiting description of a preferred but non-exclusive embodiment of the proposed telehandler, as illustrated in the accompanying drawings, in which:

FIGS. 4 to 6 are axonometric views like the two previous ones, showing successive steps of extracting the battery from the compartment; and FIG. 7 is an axonometric view of the empty compartment.

Figure 1:
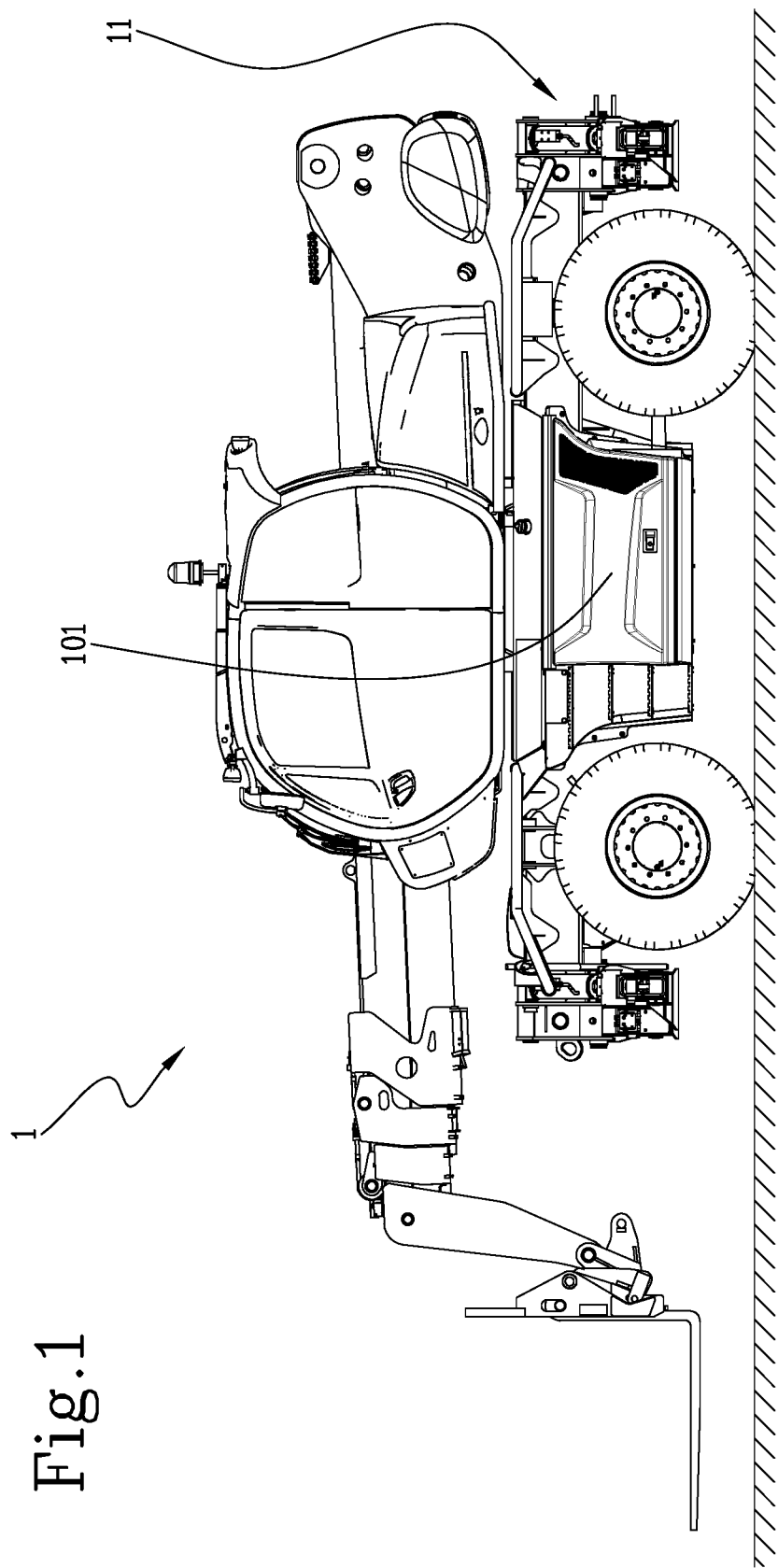
FIG. 1 is a schematic side view of a telehandler according to the invention.
Figure 2:
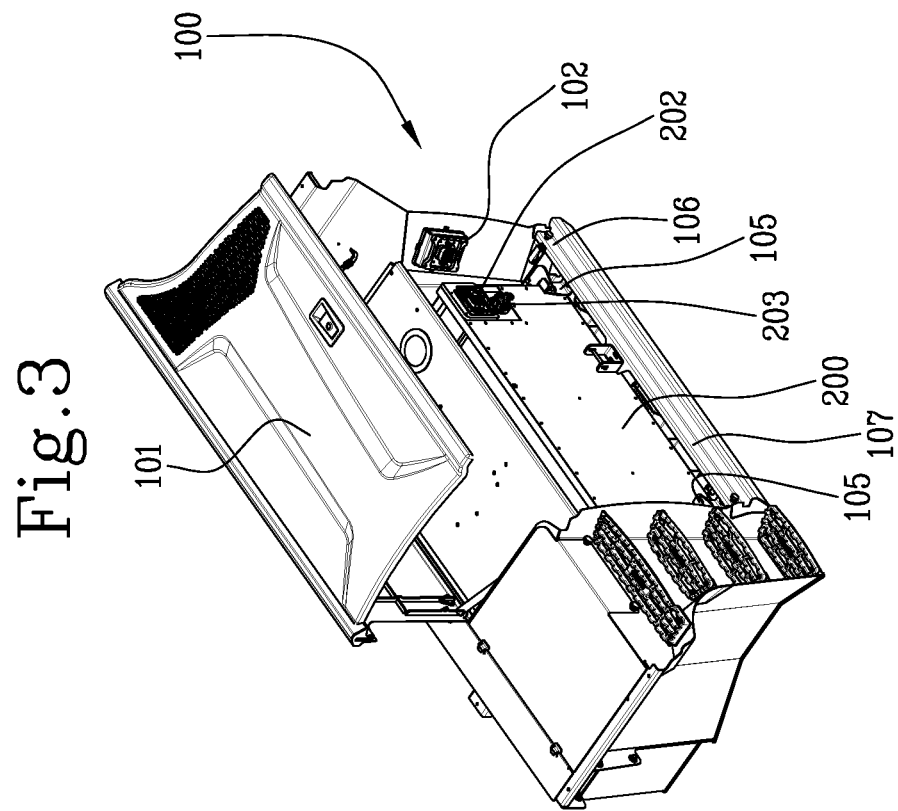
FIGS. 2 and 3 are axonometric views of a containment compartment for a replaceable battery of the telehandler of FIG. 1, respectively with the door open and with the door closed.

With reference to the first drawing, the numeral 1 denotes in its entirety an electrically powered telehandler according to the invention.

The telehandler 1 proposed is equipped with a frame 11, or "carriage", movable on wheels and may be either fixed or rotary, that is to say, it can mount the cab and the operating arm directly on the carriage or, as in the case illustrated, may be equipped with a platform, or "turret" 11, mounted rotatably on the carriage 11, which supports the cab and operating arm.

The telehandler 1 according to the invention may be hybrid or even exclusively with electric propulsion; in detail, by way of example but not exclusive, the telehandler 1 can comprise at least one electric drive motor positioned at one of the axles and an electric motor for driving the hydraulic pump which powers the movement cylinders of the arm and, if necessary, the motor-driven rack of the tower.

According to an important aspect of the invention, the carriage 11 of the telehandler 1 includes at least one containment compartment 100, accessible from the outside, to receive and contain a replaceable electric battery 200 designed for powering the motors.

For example, the carriage 11 may define two lateral compartments 100, made in its opposite lateral portions, right and left, accessible from opposite sides, in each of which a respective replaceable electric battery 200 is contained.

The compartment 100, or each compartment 100, is equipped with an opening giving access to the internal containment space of the battery 200, to allow replacement of the battery 200 by inserting and extracting.

Preferably, the access opening of the compartment 100 is positioned on a relative side of the carriage 11, facing outwards, thereby allowing an insertion and an extraction of the battery 200 along a horizontal direction. The opening is equipped with a door 101, or "hood", to allow access to the compartment 100 from the outside; the door 101 may be of the tilting type and equipped with a lock.

According to another important aspect of the invention, the compartment 100 is equipped with guide means 103, 104 for the sliding of the battery 200 during insertion and extraction, during replacement of the battery 200.

How the invention overcomes the drawbacks of the prior art is briefly explained below before further constructional and functional aspects of the invention are described.

The proposed electric telehandler 1 can work without restrictions in town centres or in closed environments, powered by its batteries 200 contained in the lateral compartments 100 of the carriage 11.

Once one of the batteries 200 according to the invention is flat, it is sufficient to open the respective compartment 100, extracting the flat battery 200, which will then be carried for recharging to a site equipped with charging means connected to the national electricity network or an electricity generator unit. In the meantime, the telehandler 1 can continue the programmed operations using the energy stored in the other battery 200.

After that, the first battery 200, once it has again been recharged, will be again transported to the work site in order, for example, to replace the other battery 200, which in the meantime has drained and so on.

This is, in reality, only one of the many ways of using the invention.

In fact, even if it is equipped with two (or more) compartments 100, the telehandler 1 may also use only one battery 200, if the activity for which it is used can be carried out before it drains or also use the current of both the batteries 200 simultaneously, as described in more detail below. On the other hand, if the telehandler 1 is equipped with a single compartment 100, it is still possible to use two batteries 200, so that once the battery housed in the compartment 100 has been discharged, the other one is already available near by, to enable replacement.

Preferably, the replaceable battery 200 according to the invention is equipped, at the lower side, with insertion seats 201 for receiving the prongs of a loading fork, to allow the movement by means of a forklift truck. In other words, the battery 200 may have a bottom which defines or consists of or is fixed to a base shaped like a pallet, for the purpose of inserting forks and the movement with a customary forklift truck.

In this case, the replacement occurs by opening the door 101, placing forks beneath the battery 200, after electrical disconnection and extracting it from the compartment 100 making it slide on the guide means 103, 104; subsequently, after placing forks beneath another battery 200, it is possible to move it to the height of the opening and then insert it by sliding in the guide means 103, 104, examples of which are described in more detail below.

Preferably, the battery 200 comprises a single connector 202 for dispensing the current, which can be connected to a respective single transmission cable positioned in the compartment 100, connected to the electrical system of the telehandler connected to the motors, for the purposes of their power supply. The drawings do not show the cable, for reasons of clarity, but the optional solution is shown of providing an internal connector 102 to the compartment to which the cable is attached when the door 101 is closed with an empty compartment 100; in this way, the telehandler 1 can be started, using the other battery 200 without an open circuit remaining in the system. Moreover, the battery 200 may be equipped with an ON/OFF switch 203 which is used to disconnect it electrically, without the need to disconnect the cable, to prevent it from being drained during non-operating periods when it remains on board the telehandler 1.

Still more in detail, the electrical system which connects the battery to the motors, using the above-mentioned cable, includes all the usual electrical and electronic devices for the operation of motors and other user devices, such as inverters positioned upstream of the motors, units for distributing the power supply downstream of the batteries (typically one for each battery), chargers for charging the batteries by means of an external socket (to be used if there is a power supply source close to the work site, for example a column for recharging the batteries) and the various circuits for the lighting of the flashing warning lights and reflectors, internal lighting, etc.

Preferably, as shown in FIG. 7, the guide means 103, 104 include a lower shaped surface 103 of the compartment 100, which is equipped with recesses for slidably receiving the seats 201 for inserting the prongs which are located at the lower surface of the battery 200.

Moreover, as shown in FIG. 6, the battery 200 may be equipped with engagement elements 204, for example in the form of wings protruding from its opposite sides.

The wings 204 which protrude from opposite lateral surfaces of the battery 200 allow a slidable engagement with respective lateral guide elements 104 (see FIG. 7), made, for example, by metal plates, which are positioned in the compartment 100, to define shelves 104 on which the wings 204 of the battery 200, which are therefore supported by them, slide into place.

Further, releasable locking means 105, 106, 107 may be provided to prevent the involuntary extraction of the battery 200 from the inside of the compartment 100.

Figure 3:
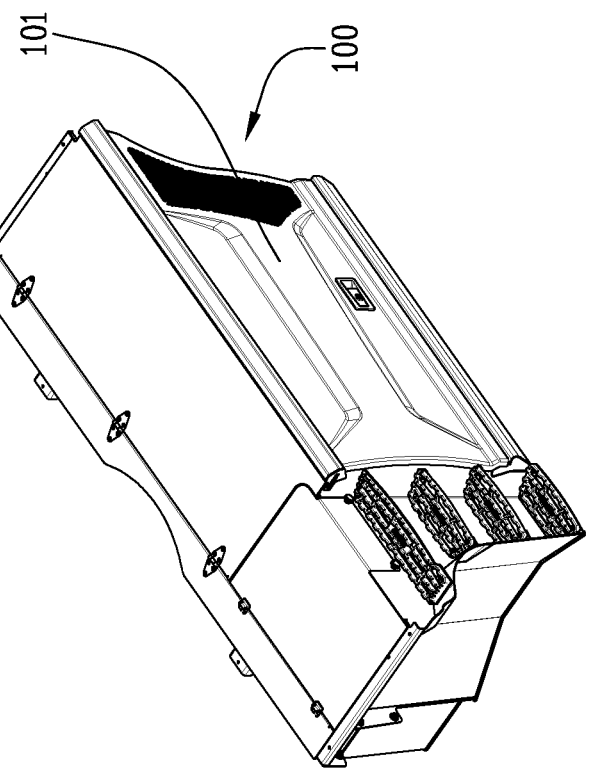

According to the version shown by way of example in FIGS. 3-7, the locking means firstly include shaped plates 105, which can be attached to the lower surface of the compartment 100, close to the edge of the opening, by means of screws and each comprise a respective folded end, provided for being engaged by a respective contact segment of an L-shaped plate 106, which is hinged at each lateral inner surface of the compartment 100, so as to be able to move from a horizontal stop position to a vertical release position.

Moreover, the locking means may also comprise a tilting retaining panel 107, hinged at the lower edge of the opening and which can be lowered upon completion of the extraction and insertion of the battery 200.

As already partly mentioned, the invention may include electronic processing means, connectable to the battery 200 or to the batteries 200 contained/and in the compartment 100 and designed to adjust the supply of current.

In particular, the processing means, which may also consist of or included in or connected to the control unit usually used in telehandlers 1, include a regulating module configured in such a way as to adjust the supply of current of the various batteries 200 according to variable proportions.

In other words, if the telehandler 1 is fitted with two batteries 200, for example, the operator in the cab can establish, by means of a user interface connected to the processing means, how much current is to be picked up from one of the batteries 200 relative to the other in order to supply the user devices of the vehicle; in particular cases, only one battery 200 supplies the electric motors of the telehandler 1 or both the batteries 200 dispense half of the electricity requested.

The invention claimed is:

1. An electric telehandler equipped with at least one electric motor, at least one containment compartment for receiving at least one electric battery for powering said motor and at least one replaceable electric battery which can be inserted into and removed from said compartment,
   wherein the compartment is equipped with an access opening to allow replacement of the battery and guide means for the sliding of the battery during the insertion and the extraction,
   wherein the battery is equipped, at a lower side, with insertion seats for receiving the prongs of a loading form, to allow the movement by means of a forklift truck, and
   wherein said guide means includes a lower surface of the compartment, which is equipped with recesses for slidably receiving the insertion seats.

2. The telehandler according to claim 1, further comprising a carriage movable on wheels, wherein the compartment is made in said carriage, with the access opening positioned on a side of the carriage.

3. The telehandler according to claim 2, further comprising at least two compartments for each receiving a respective battery, having the respective opening positioned at opposite sides of said carriage.

4. The telehandler according to claim 1, wherein the battery is equipped with elements for engaging on its opposite sides designed to allow a sliding engagement with respective lateral guide elements positioned inside the compartment and comprising above-mentioned guide means.

5. The telehandler according to claim 1, further comprising releasable locking means to prevent the involuntary extraction of the battery from the inside of the compartment.

6. The telehandler according to claim 1, wherein the battery comprises a single connector for dispensing the current, connectable to a respective cable positioned in the compartment, which is connected to the motor or to the motors, for the purposes of its power supply.

7. The telehandler according to claim 1, further comprising electronic processing means connectable to the battery contained in the compartment and designed to adjust the supply of current.

8. The telehandler according to claim 7, further comprising a plurality of batteries for powering the motor or the motors, wherein said processing means include an adjusting module configured in such a way as to adjust the current supply of the various batteries according to variable proportions.

9. The telehandler according to claim 4, wherein the battery is equipped with engagement elements in the form of wings protruding from its opposite sides, so as to allow a slidable engagement with respective lateral guide elements made by metal plates so as to define shelves on which the wings of the battery, which are therefore supported by them, slide into place.

10. The telehandler according to claim 5, wherein the locking means include shaped plates, which comprise a respective folded end, provided for being engaged by a respective contact segment of an L-shaped plate, which is hinged at each lateral inner surface of the compartment, so as to be able to move from a horizontal stop position to a vertical release position.

11. The telehandler according to claim 5, wherein the locking means comprise a tilting retaining panel, hinged at the lower edge of said opening the compartment and which can be lowered upon completion of the extraction and insertion of the battery.

* * * * *